US005314647A

United States Patent [19]

Rieth

[11] Patent Number: 5,314,647

[45] Date of Patent: May 24, 1994

[54] METHOD OF MAKING CELLULOSE ESTER PHOTOGRAPHIC FILM BASE

[75] Inventor: John E. Rieth, Penfield, N.Y.

[73] Assignee: Eastman Kodak Company, Rochester, N.Y.

[21] Appl. No.: 915,223

[22] Filed: Jul. 20, 1992

[51] Int. Cl.[5] ........................ B29D 7/01; B29C 35/10; B29K 1/00

[52] U.S. Cl. ........................................ 264/25; 264/207; 264/217; 425/174.8 R

[58] Field of Search .................... 264/25, 26, 207, 217; 425/174.8 R

[56] References Cited

U.S. PATENT DOCUMENTS

| | | | |
|---|---|---|---|
| 2,245,429 | 6/1941 | Carver et al. | 264/207 |
| 2,542,301 | 2/1951 | Barrington | 264/26 |
| 5,152,947 | 10/1992 | Takeda et al. | 264/207 |

FOREIGN PATENT DOCUMENTS

| | | |
|---|---|---|
| 3041-586 | 5/1982 | Fed. Rep. of Germany . |

OTHER PUBLICATIONS

"Plastics-Microwaves Pros and Cons", Wiel, *SPE Journal,* Nov. 1968, vol. 24, pp. 29-32.

*Primary Examiner*—James Lowe
*Attorney, Agent, or Firm*—Robert A. Gerlach

[57] ABSTRACT

A method of making cellulose ester photographic film base employing microwave radiation for removing the final portion of solvent present in the film.

9 Claims, 2 Drawing Sheets

METHOD OF MAKING CELLULOSE ESTER PHOTOGRAPHIC FILM BASE

BACKGROUND OF THE INVENTION

FIELD OF THE INVENTION

This invention relates Lo a method of making cellulose ester photographic film base and more particularly to a method of preparing photographic film base having fewer imperfections than the methods currently employed which method is conducted in a much shorter period of time.

It is known in the art to prepare cellulose ester photographic film base materials by casting a cellulose ester solution or dope in the form of a film on a highly polished surface of a rotating wheel or band, causing the film to set by evaporation of a portion of the volatile solvent present in the casting solution, stripping the film from the casting wheel or band while it still contains a high percentage of solvent but has sufficient strength to maintain its form and then drying the film by passing it through various chambers while directing hot air over the surface thereof as the film is continuously transported by numerous rollers until the final and desired state of dryness is reached. Then the film base is wound upon itself in a roll for further processing into photographic element.

A problem chat accompanies this process is that as the utility for the film base is in the production of photographic film of all types, any imperfections that are present in the film will be carried over into the final product. Thus, rigid inspection methods must be employed and any imperfections Chat are present in the film base must be removed before the base can be employed as the substrate upon which photographic elements are built. As each of the rollers over which the film base passes during the drying cycle can be a source of imperfections in the film base, it is desirable to reduce the number of such rollers to a minimum and at the same time shorten the preparation time for the cellulose ester film base.

SUMMARY OF THE INVENTION

The invention provides an improvement in the method of making a cellulose ester photographic film base by casting a cellulose ester polymer in a solvent onto a moving surface, stripping the film from the surface, drying in hot air and removing the final portion of the solvent present in the film by the application of microwave energy. This improvement reduces the number of rollers needed to properly dry the film by 80 to 90 percent, while at the same time increasing the speed at which the cellulose ester film is manufactured thereby resulting in economic gains due both to the lower capital expenditures required and for the cycle time from start to finish of the operation. These advantages are in addition to the improvement in the surface quality of the film thus produced.

DESCRIPTION OF THE PREFERRED EMBODIMENT

The present invention provides a highly efficient process for the rapid removal of the final 40%, preferably the final 20% and most preferably the final 15% of the solvent employed in the casting dope for the preparation of cellulose ester photographic film base. In the process of making cellulosic film base, the initial portion of the solvent flashes off very rapidly. Thus, the film strength increases rapidly while the film is present on the casting surface and this enables the film to be stripped therefrom in short periods of time. Secondly, the film once stripped from the casting surface is subjected at a hot air drying cycle in order to permit the solvent removal form both surfaces of the film.

Finally, the film passes from the hot air drying zone through a zone where the film is subjected to microwave energy. This is a relatively short zone compared with the previous hot air drying cycles for removing the final portion of solvent present in the film.

Figure 2:
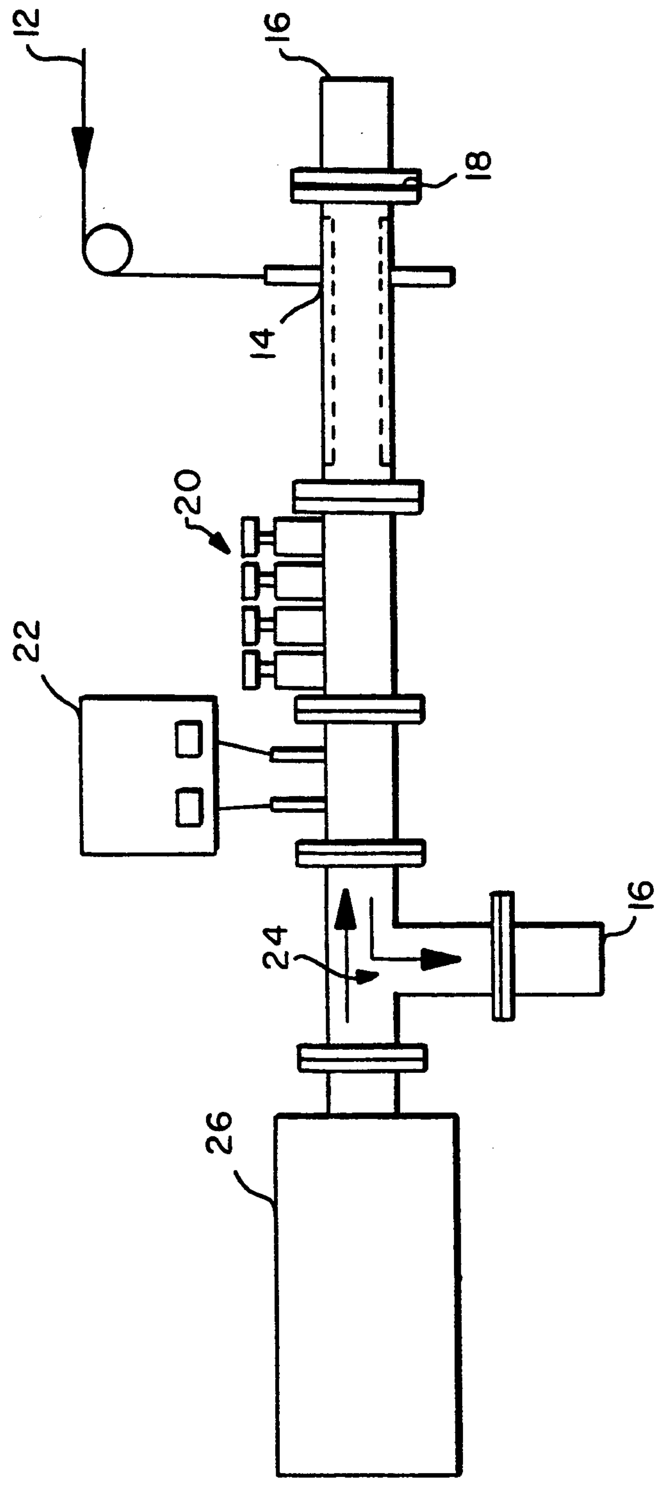
FIG. 2 is a schematic representation of an apparatus suitable for use in practicing this invention.

A suitable apparatus for practicing the process of this invention is shown in FIG. 2. In this embodiment, cellulose triacetate film 12 after being stripped form the casting surface (not shown) is passed through a hot air drying zone (not shown) and then, in the direction of the arrows, through a slotted waveguide 14 equipped with dummy loads 16, a brass iris 18, tuner 20, power meters 22, circulator 24 and microwave power source 26. A suitable power source is a GL103A SIN 022 with power source controller made by Gerling Laboratories, Modesto, Calif. This source 26 has a type GL-131B magnetron, a peak operating voltage of 6200 volts DC, a maximum power output of 3000 watts, an operating frequency of 2450+20−30 MHz, power requirements of 208/120 volts AC, 3WYE, 4 ground wires, 30 Amps/Phase 60 Hz and water cooling requirements of 0.5 GPM.

While the initial portion of the solvent flashes off from the cellulose ester film quite rapidly, the final portion under standard hot air drying conditions requires a long time and thus long film paths. Therefore the film in continuous production must travel over numerous rollers which are disposed such that the film proceeds through many ascending and descending vertical paths while in the heating zone or zones, each of which may be maintained at different temperatures.

Figure 1:
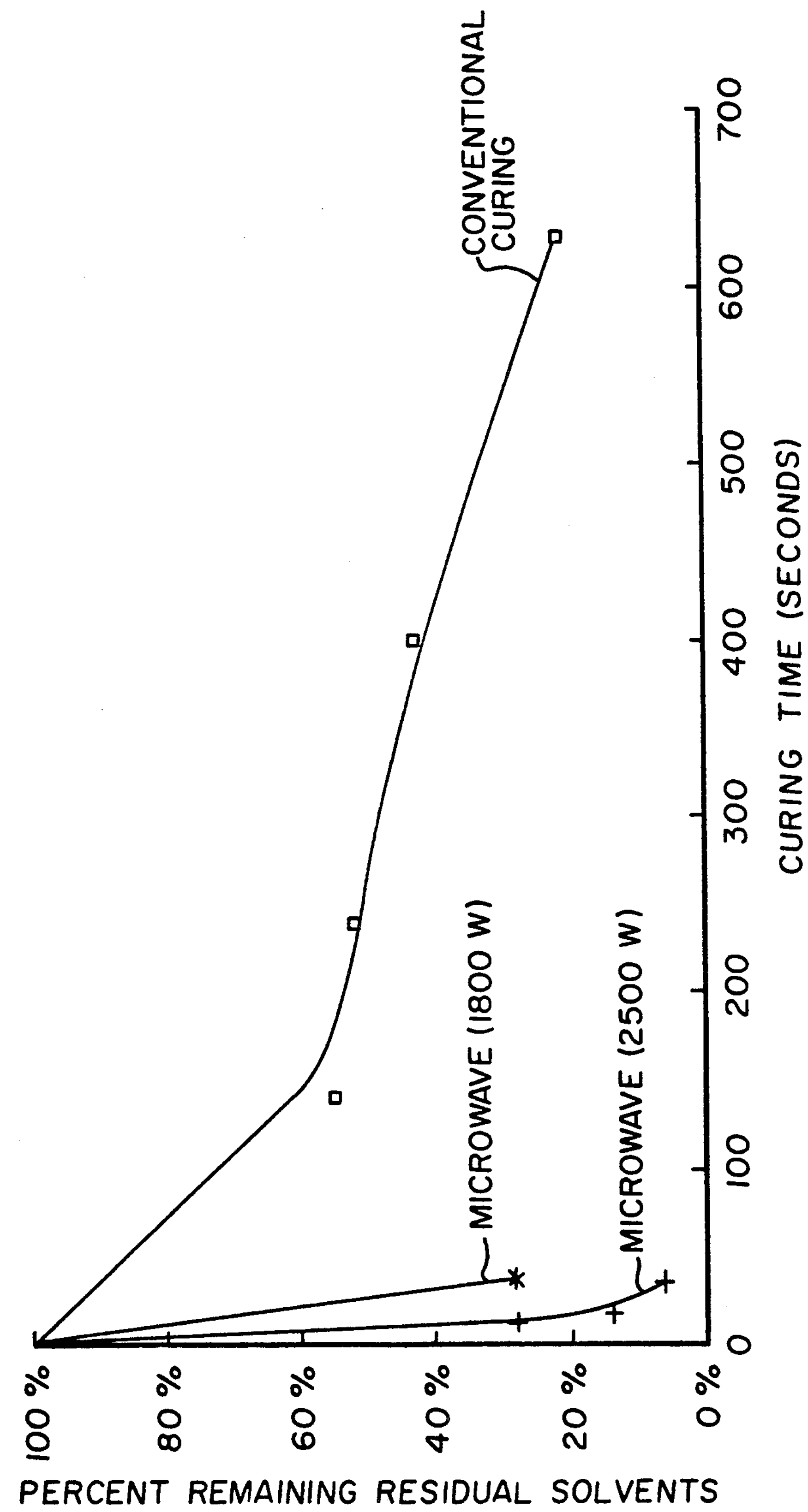
FIG. 1 is a curve comparing the drying time for a conventional hot air method of drying cellulose ester film with the time required for a microwave drying treatment.

As clearly illustrated in FIG. 1, the final percentage of the solvent is removed when operating in accordance with this invention in approximately 36 seconds while a film dried in accordance with currently employed techniques utilizing hot air chambers requires approximately 630 seconds. This is generally true at both power levels shown.

Cellulose ester dopes useful in the preparation of cellulose ester films are well known and have been described in numerous patents and publications. Useful cellulose esters include lower fatty acid esters of cellulose, such as, cellulose acetate, cellulose propionate and cellulose butyrate and mixed lower fatty acid esters of cellulose such as cellulose acetate propionate, cellulose acetate butyrate and cellulose propionate butyrate and the like. The cellulose ester is dissolved, in a solvent or mixture of solvents, typically in an amount of from about 0.15 to about 0.35 parts of cellulose ester per part of solvent medium by weight. Useful solvents include alcohols, ketones, esters, ethers, glycols, hydrocarbons and halogenated hydrocarbons.

Preferred alcohols for use in the cellulose ester compositions of this invention are lower aliphatic alcohols containing 1 to 6 carbons atoms, such as methanol, ethanol, n-propyl alcohol, isopropyl alcohol, n-butyl alcohol, isobutyl alcohol, n-pentyl alcohol, n-hexyl alcohol, and the like.

Preferred ester solvents for use in the cellulose ester compositions of this invention are those represented by the formula where R and R' are independently alkyl groups of 1 to 4 carbon atoms, such as methyl acetate, ethyl acetate, n-propyl acetate, isobutyl acetate, ethyl propionate, ethyl isobutyrate, and the like.

Preferred ketone solvents for use in the cellulose ester compositions of this invention are those represented by the formula

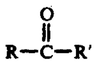

where R and R' are independently alkyl groups of 1 to 4 carbon atoms, such as acetone, methyl ethyl ketone, methyl n-propyl ketone, diethyl ketone, and the like.

Other particularly useful solvents include hydrocarbons, such as cyclohexane, and halogenated hydrocarbons, such as methylene chloride and propylene chloride.

More than one member of a particular class of compounds, for example, two different alcohols or two different ketones can be used, if desired, or the solvent medium can comprise a mixture of compounds from several different classes, such as a mixture of an alcohol, a ketone and a halogenated hydrocarbon. A particularly preferred solvent system comprises a mixture of methanol and methylene chloride.

In addition to the cellulose ester and solvent, the dope used for forming a cellulose ester film usually contains a plasticizer. Useful plasticizers include dimethyl phthalate, diethyl phthalate, triethyl phosphate, triphenyl phosphate, triethyl citrate, dibutyl sebacate, methoxymethyl phthalate, di-(2-methoxyethyl) phthalate, and the like.

The invention is further illustrated by the following examples:

EXAMPLE 1

A cellulose triacetate dope solution containing 18% by weight of cellulose triacetate and 3% by weight triphenyl phosphate and methoxyethyl phthalate plasticizers dissolved in a mixture of 91% methylene chloride, 6% methyl alcohol and 3% butyl alcohol is hand coated onto a polished casting surface. The self sustaining triacetate film is stripped from the plate, cut into 1 inch by 6 inch strips, supported and transported through a slotted microwave waveguide. Residual solvent levels in the film are recorded before and after subjecting the sample to the microwave. Residual solvent levels are as high as 18% by weight. This procedure is repeated at various power levels (1800 and 2500 W) and lengths of exposure time (12, 18 and 36 seconds). Results are shown in TABLE 1. No decrease in product quality (bubbles or wrinkling) are detected. A comparison with conventional methods of using hot air and microwave method to remove the solvent is shown in TABLE 2 - Percent of Solvent Remaining vs Time.

TABLE 1

| Time (Seconds) | | % Solvent | Delta | % Reduction |
|---|---|---|---|---|
| 2500 watts | | | | |
| 12 sec | Before | 13.23 | 9.59 | 72.49% |
| | After | 3.64 | | |
| 18 sec | Before | 17.81 | 15.43 | 86.64% |
| | After | 2.38 | | |
| 36 sec | Before | 14.36 | 13.6 | 94.71% |
| | After | 0.76 | | |
| 36 sec | Before | 11.14 | 10.43 | 93.63% |
| | After | 0.71 | | |
| 1800 watts | | | | |
| 36 sec | Before | 10.56 | 7.59 | 71.88% |
| | After | 2.97 | | |
| 36 sec | Before | 9.32 | 6.75 | 72.42% |
| | After | 2.57 | | |

TABLE 2

| | Percent of Solvent Remaining vs Time | | |
|---|---|---|---|
| Time (Seconds) | Conventional Hot Air | Microwave 1800 W | Microwave 2500 W |
| 0 | 100.00% | 100.00% | 100.00% |
| 12 | | | 27.51% |
| 18 | | | 13.36% |
| 36 | | 27.85% | 5.83% |
| 140 | 54.45% | | |
| 240 | 51.33% | | |
| 400 | 41.78% | | |
| 630 | 20.02% | | |

FIG. 2 shows the apparatus used for this example. The apparatus and parameters employed in this examples are as described above.

EXAMPLE 2

Continuous Manufacturing Process

A cellulose triacetate dope solution containing 18% to 35% by weight of cellulose triacetate and 3% to 5% by weigh triphenyl phosphate and methoxyethyl phthalate plasticizers dissolved in a mixture of 85% to 95% methylene chloride, 3% to 9% methyl alcohol and 1% to 12% other "non-solvent" (butyl alcohol, cyclohexane, etc.) is cast onto a polished casting surface endless band. The self sustaining triacetate films is stripped from the polished casting surface and transported through a slotted microwave waveguide. The film is restrained from shrinking in order to maintain or enhance the quality of the film Results comparable to that of Example 1 are observed.

What is claimed is:

1. In a method of making a cellulose ester photographic film base which comprises casting a cellulose ester polymer in a solvent onto a moving surface, stripping the film from the surface and drying in hot air the improvement which comprises removing the final portion of the solvent present in the film by subjecting the film to microwave radiation.

2. The method of claim 1 wherein the cellulose ester is cellulose acetate.

3. The method of claim 2 wherein the cellulose acetate is cellulose diacetate.

4. The method of claim 2 wherein the cellulose acetate is cellulose triacetate.

5. The method of claim 1 wherein the solvent is methylene dichloride.

6. The method of claim 1 wherein the solvent is a mixture of methylene dichloride and methanol.

7. The method of claim 1 wherein microwave radiation is employed to remove the final 40 percent of the solvent present in the film.

8. The method of claim 1 wherein microwave radiation is employed to remove the final 20 percent of the solvent present in the film.

9. The method of claim 1 wherein microwave radiation is employed to remove the final 15 percent of the solvent present in the film.

* * * * *